(12) United States Patent
Wang

(10) Patent No.: US 6,578,662 B1
(45) Date of Patent: Jun. 17, 2003

(54) TELESCOPIC BUFFER DEVICE

(76) Inventor: Chou-Yung Wang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/104,857

(22) Filed: Mar. 21, 2002

(51) Int. Cl.[7] ............................................. F16F 15/00
(52) U.S. Cl. ...................................................... 181/209
(58) Field of Search .................................. 181/209, 207, 181/208

(56) References Cited

U.S. PATENT DOCUMENTS 5,217,267 A * 6/1993 Yagi ............................ 292/338
6,296,338 B1 * 10/2001 Stijns ........................... 312/333

FOREIGN PATENT DOCUMENTS

DE 2317556 * 10/1974

* cited by examiner

Primary Examiner—Shih-Yung Hsieh

(57) ABSTRACT

A telescopic buffer device has two slide racks, a plurality of covers disposed on the slide racks, a plurality of connection plates, a plurality of positioning plates, a plurality of shafts, and a plurality of roller wheels. The covers are connected telescopically. Each connection plate is disposed on the corresponding cover. Each connection plate has a U-shaped recess. Each positioning plate has an L-shaped slot to receive the corresponding connection plate, a lower notch, a through hole, and an arc-shaped lower end. Each roller wheel is inserted in the corresponding lower notch of the positioning plate. Each shaft is inserted through the corresponding through hole of the positioning plate and the corresponding roller wheel.

2 Claims, 7 Drawing Sheets

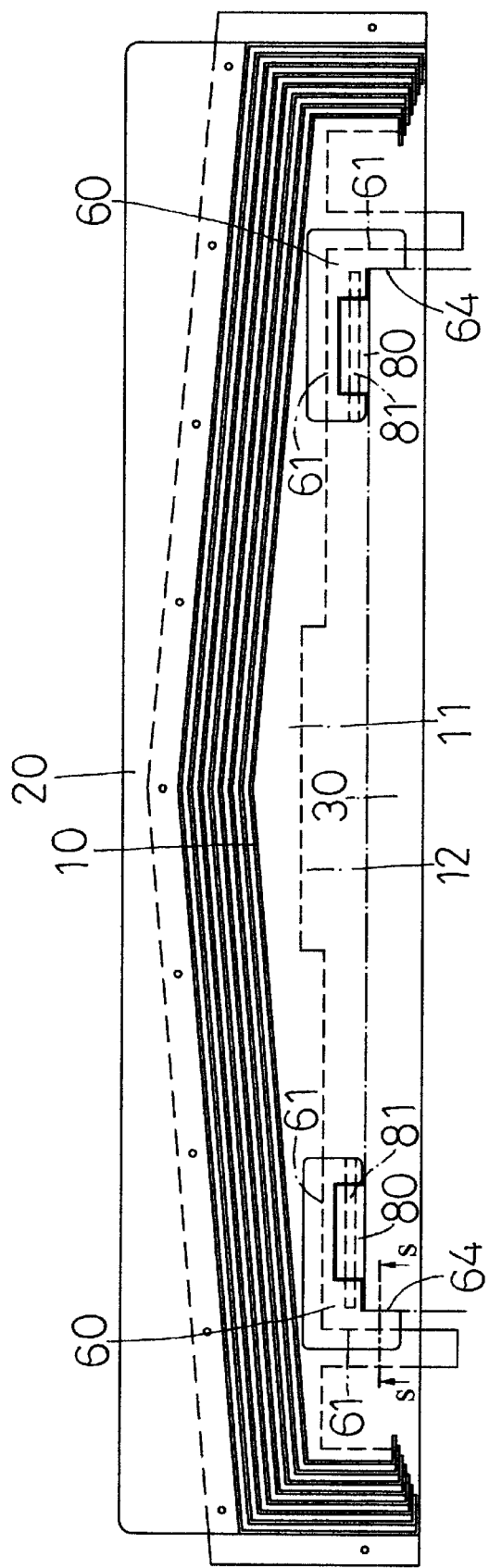
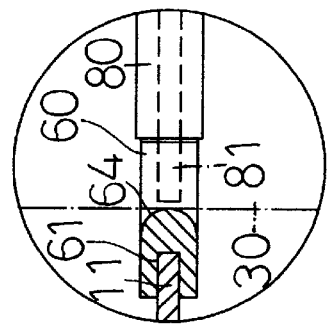
FIG. 2
FIG. 2A

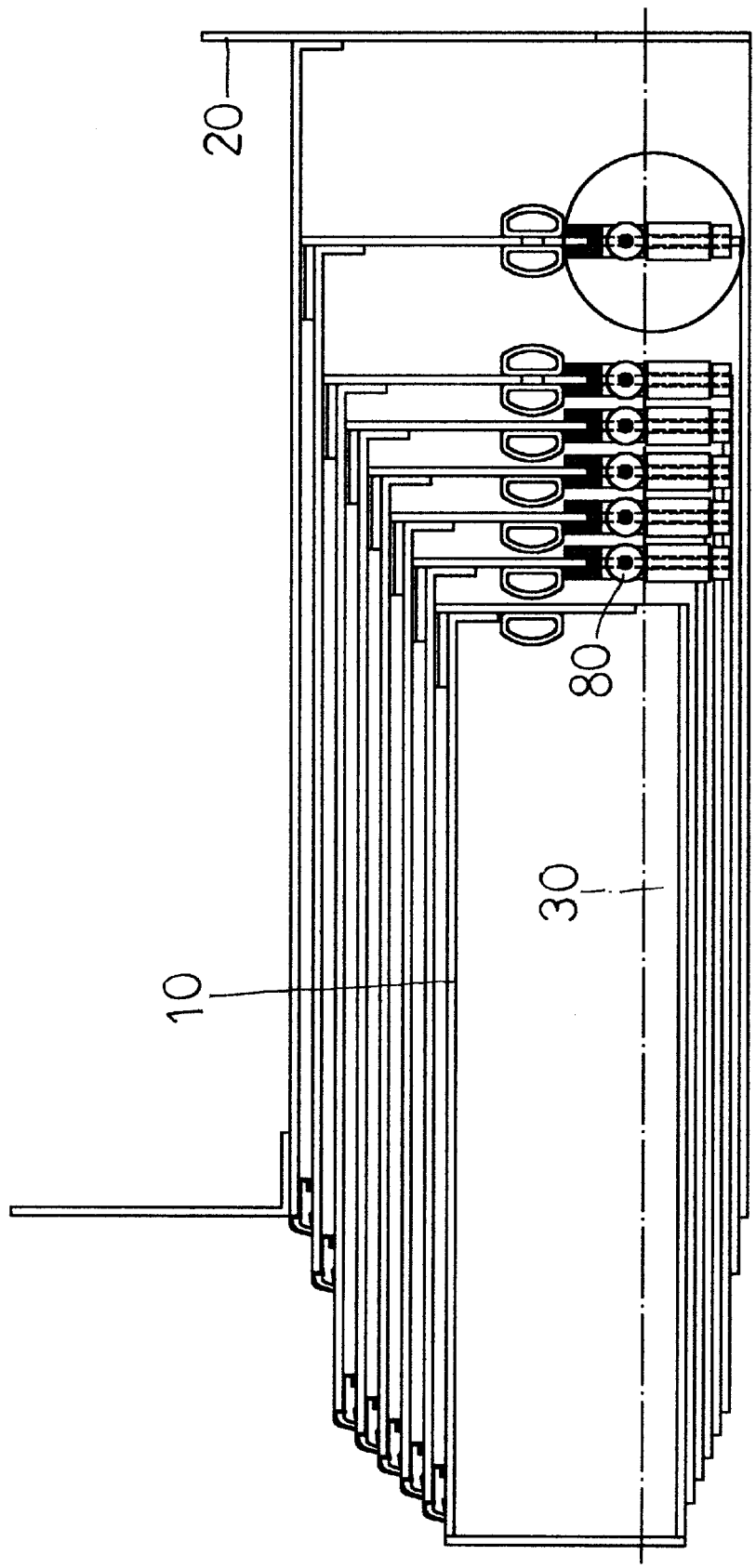

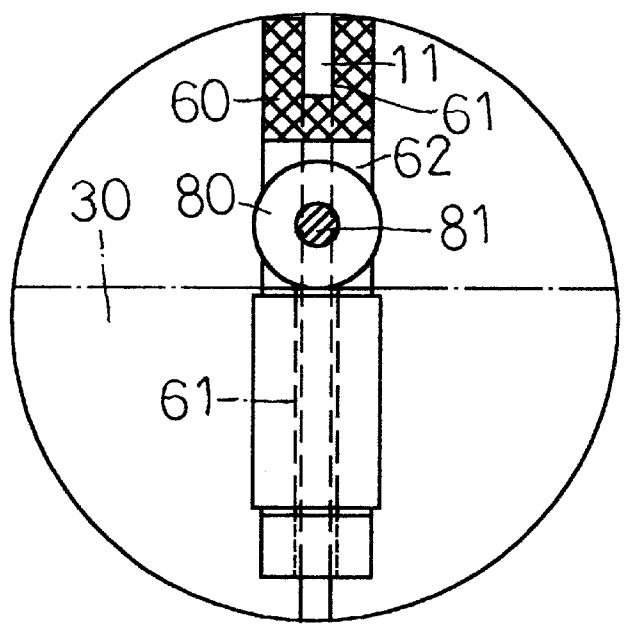
F I G. 3A
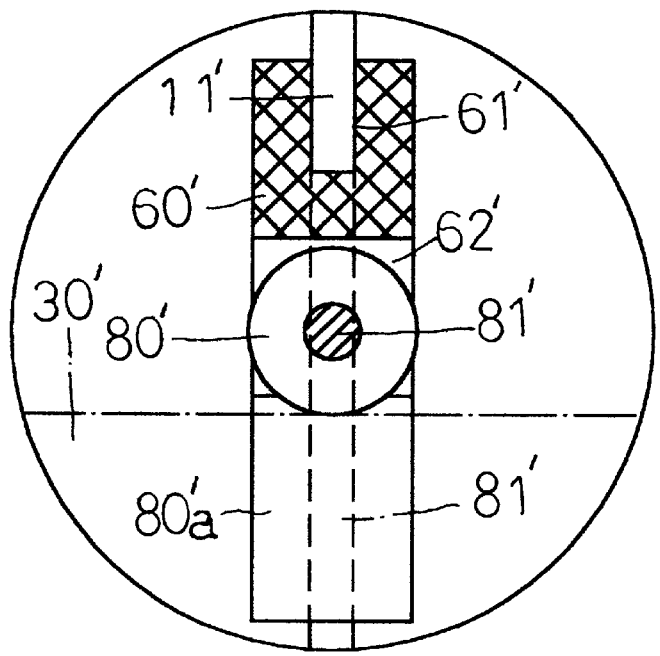
F I G. 6A

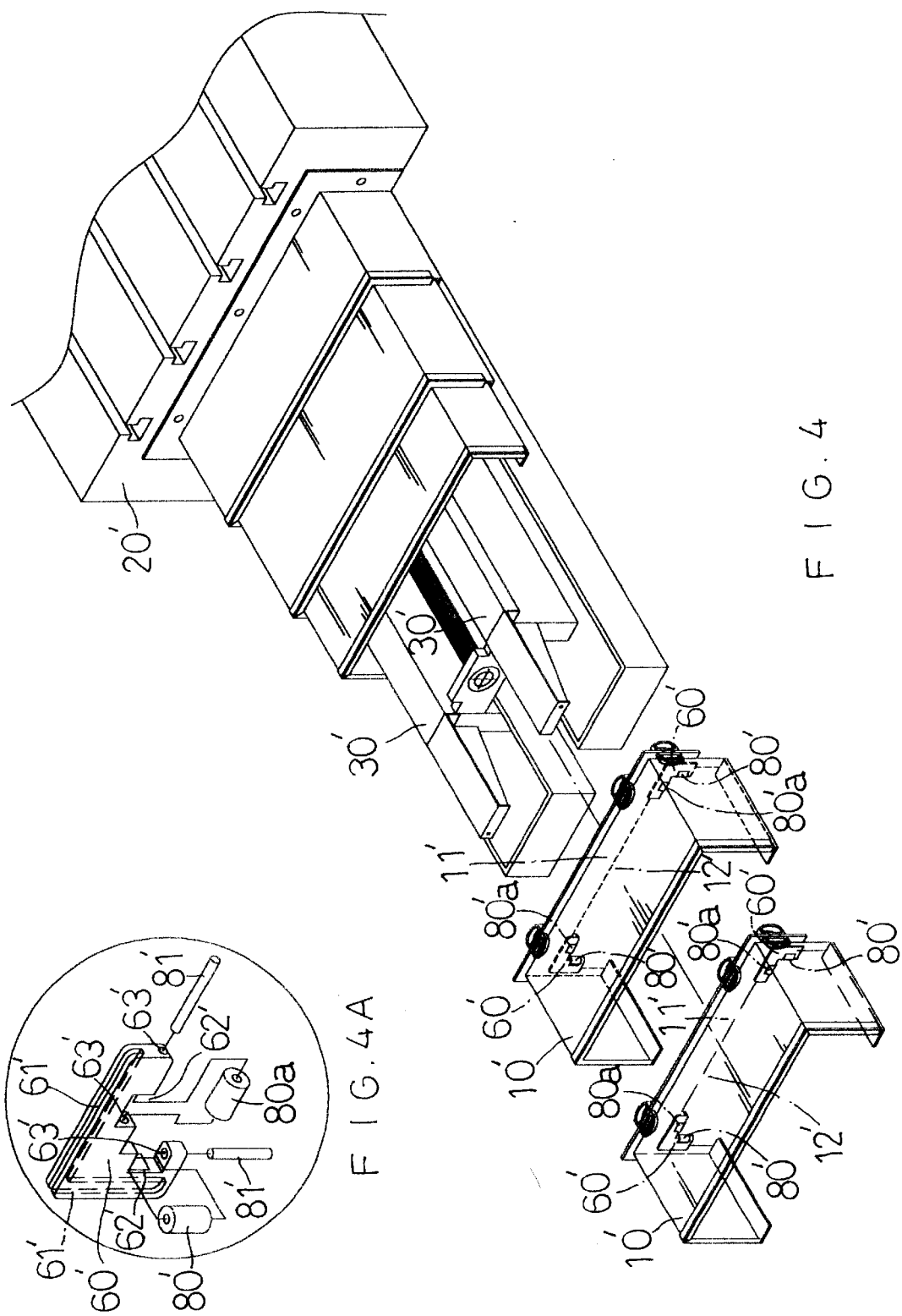

TELESCOPIC BUFFER DEVICE

BACKGROUND OF THE INVENTION

The present invention relates to a telescopic buffer device. More particularly, the present invention relates to a telescopic buffer device which has an excellent muffler function.

A conventional telescopic buffer device is disposed on a machine. The telescopic buffer device has a slide rack, and a, plurality of covers disposed on the slide rack. Each of the covers has a plurality of generally T-shaped buffer pads. However, the generally T-shaped buffer pads cannot buffer and absorb vibration and bumping force very efficiently.

SUMMARY OF THE INVENTION

An object of the present invention is to provide a telescopic buffer device which is used as an excellent muffler.

Another object of the present invention is to provide a telescopic buffer device which uses less elements.

Accordingly, a telescopic buffer device comprises a pair of parallel slide racks, a plurality of covers disposed on the slide racks, a plurality of connection plates, a plurality of positioning plates, a plurality of shafts, and a plurality of roller wheels. The covers are connected telescopically. Each of the connection plates is disposed on the corresponding cover. Each of the connection plates has a U-shaped recess. Each of the positioning plates has an L-shaped slot to receive the corresponding connection plate, a notch, a through hole, and an arc-shaped lower end. A width of each of the connection plates is larger than a width of the corresponding L-shaped slot of the positioning plate. Each of the connection plates is connected to two of the positioning plates. Each of the roller wheels is inserted in the corresponding lower notch of the positioning plate. Each of the shafts is inserted through the corresponding through hole of the positioning plate and the corresponding roller wheel.

BRIEF DESCRIPTION OF THE DRAWINGS

FIG. 1A is a perspective exploded view of a positioning plate, a shaft, and a roller wheel of a first preferred embodiment in accordance with the present invention;

FIG. 2 is a sectional assembly view of a telescopic buffer device of a first preferred embodiment in accordance with the present invention;

FIG. 2A is a sectional view taken along line S—S in FIG. 2;

FIG. 3 is a sectional schematic view illustrating an application of a plurality of positioning plates, a plurality of shafts, and a plurality of roller wheels of a first preferred embodiment in accordance with the present invention;

FIG. 3A is a sectional assembly view of a positioning plate, a shaft, and a roller wheel of a first preferred embodiment in accordance with the present invention;

FIG. 4 is a perspective exploded view of a telescopic buffer device of a second preferred embodiment in accordance with the present invention;

FIG. 4A is a perspective exploded view of a positioning plate, a shaft, and a roller wheel of a second preferred embodiment in accordance with the present invention;

FIG. 6A is a sectional assembly view of a positioning plate, a shaft, and a roller wheel of a second preferred embodiment in accordance with the present invention.

DETAILED DESCRIPTION OF THE INVENTION

Figure 1:
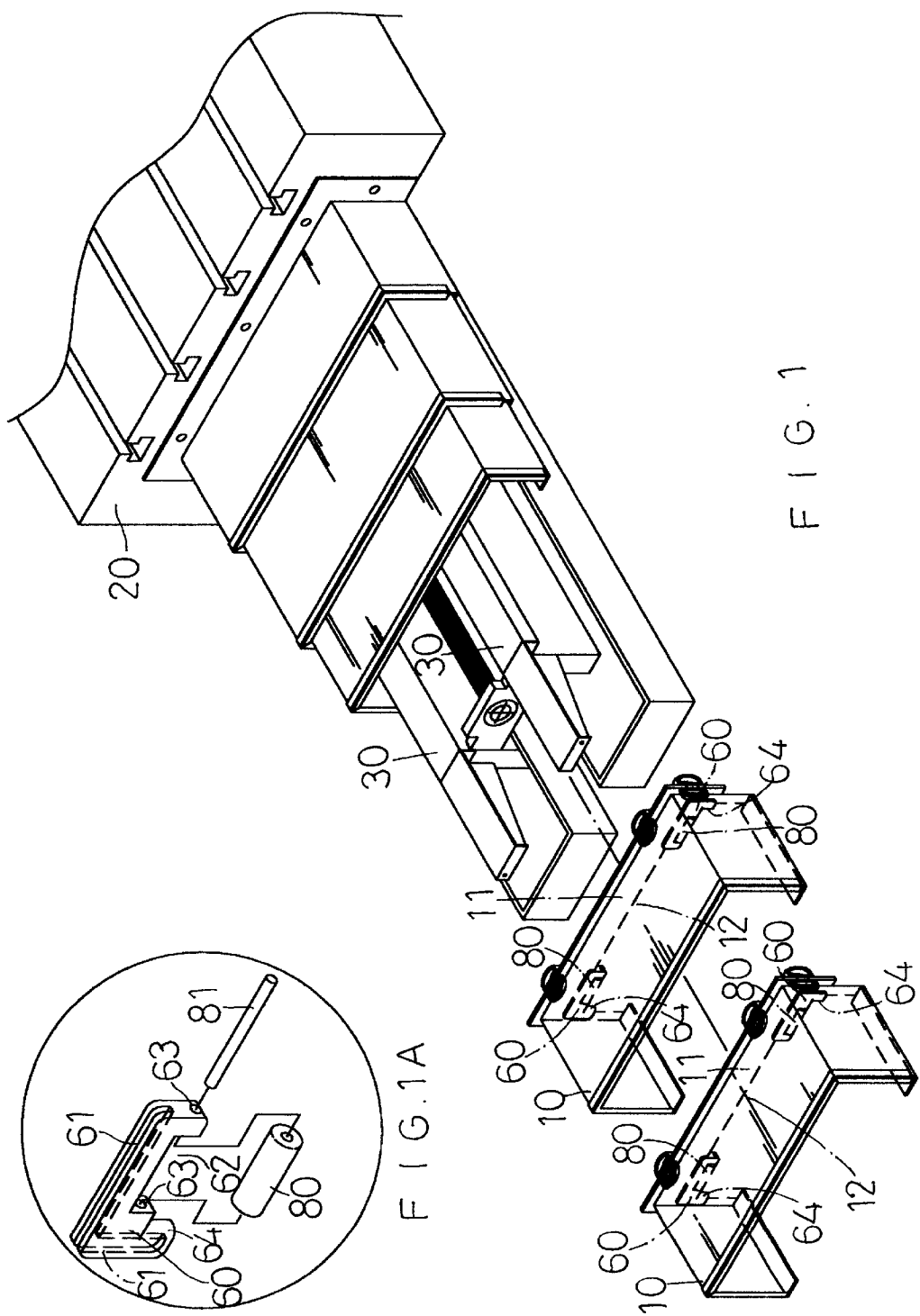
FIG. 1 is a perspective exploded view of a telescopic buffer device of a first preferred embodiment in accordance with the present invention.

Referring to FIGS. 1 to 3A, a first telescopic buffer device is disposed on a machine 20. The first telescopic buffer device comprises a pair of parallel slide racks 30, a plurality of covers 10 disposed on the slide racks 30, a plurality of connection plates 11, a plurality of positioning plates 60, a plurality of shafts 81, and a plurality of roller wheels 80.

The covers 10 are connected telescopically.

Each of the connection plates 11 is disposed on the corresponding cover 10.

Each of the connection plates 11 has a U-shaped recess 12.

Each of the positioning plates 60 has an L-shaped slot 61 to receive the corresponding connection plate 11, a lower notch 62, a through hole 63, and an arc-shaped lower end 64.

A width of each of the connection plates 11 is larger than a width of the corresponding L-shaped slot 61 of the positioning plate 60.

Each of the connection plates 11 is connected to two of the positioning plates 60.

Each of the roller wheels 80 is inserted in the corresponding lower notch 62 of the positioning plate 60.

Each of the shafts 81 is inserted through the corresponding through hole 63 of the positioning plate 60 and the corresponding roller wheel 80.

Then each roller wheel 80 and the arc-shaped lower end 64 of each positioning plate 60 slide on the corresponding slide rack 30.

Figure 5:
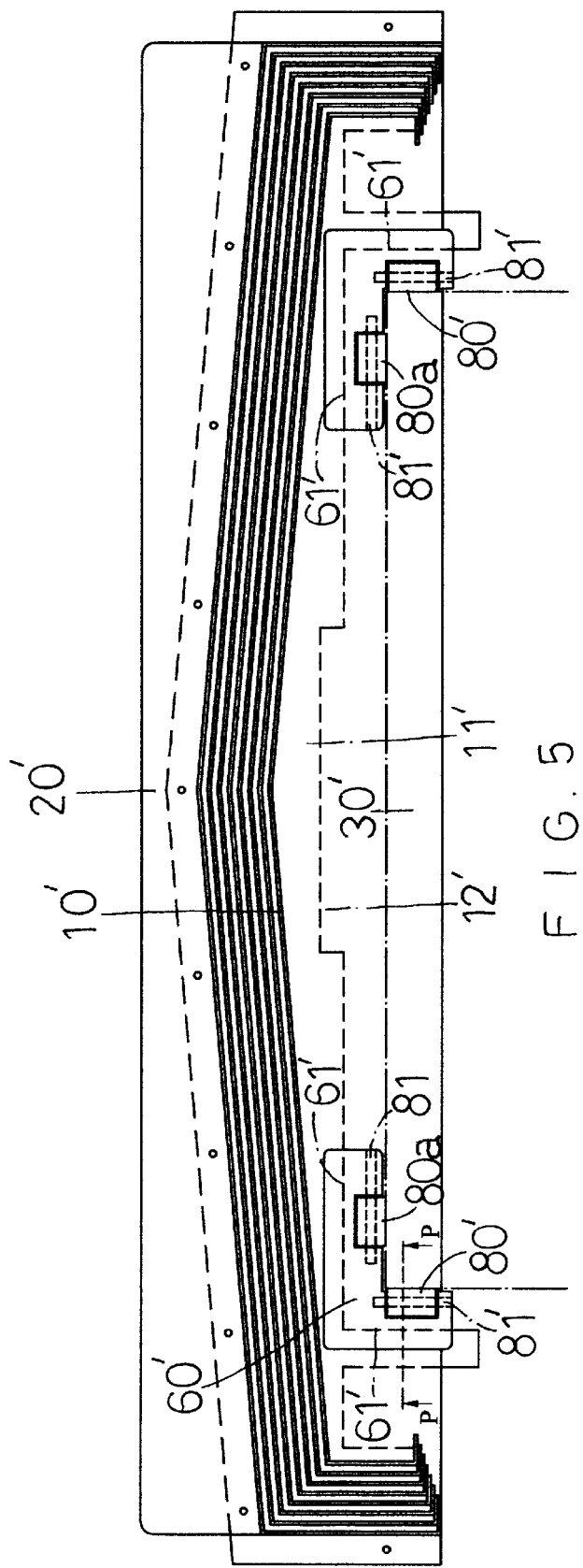
FIG. 5 is a sectional assembly view of a telescopic buffer device of a second preferred embodiment in accordance with the present invention.
Figure 5A:
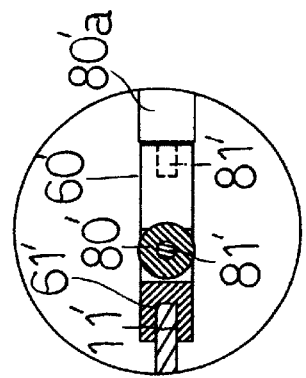
FIG. 5A is a sectional view taken along line P—P in FIG. 2.
Figure 6:
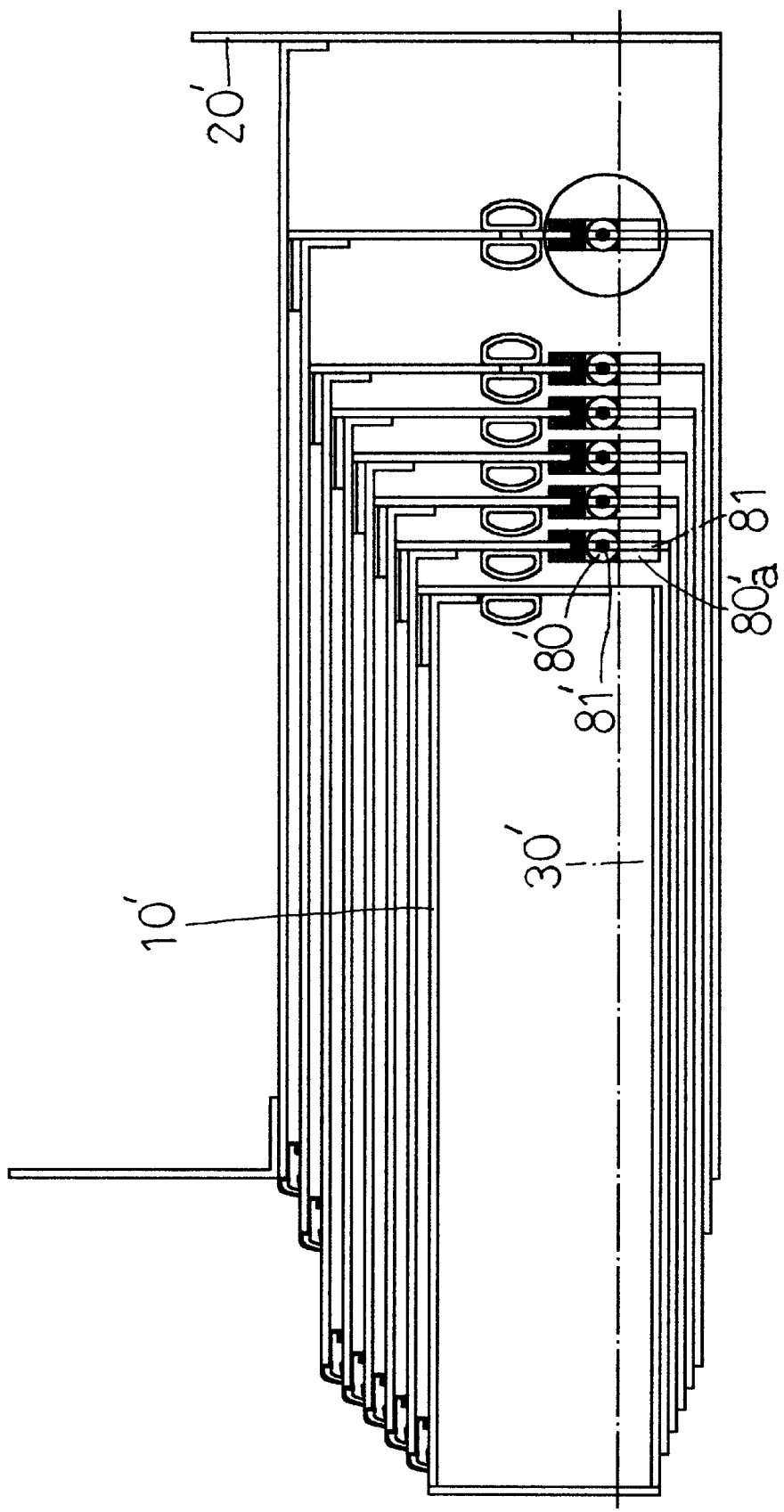
FIG. 6 is a sectional schematic view illustrating an application of a plurality of positioning plates, a plurality of shafts, and a plurality of roller wheels of a second preferred embodiment in accordance with the present invention.

Referring to FIGS. 4 to 6A, a second telescopic buffer device is disposed on a machine 20'. The second telescopic buffer device comprises a pair of parallel slide racks 30', a plurality of covers 10' disposed on the slide racks 30', a plurality of connection plates 11', a plurality of positioning plates 60', a plurality of shafts 81', and a plurality of roller wheels 80' and 80a.

The covers 10' are connected telescopically.

Each of the connection plates 11' is disposed on the corresponding cover 10'.

Each of the connection plates 11' has a U-shaped recess 12'.

Each of the positioning plates 60' has an L-shaped slot 61' to receive the corresponding connection plate 11', two notches 62', and two through holes 63'.

A width of each of the connection plates 11' is larger than a width of the corresponding L-shaped slot 61'of the positioning plate 60'.

Each of the connection plates 11' is connected to two of the positioning plates 60'.

Each of the roller wheels 80' and 80a is inserted in the corresponding notch 62' of the positioning plate 60'.

Each of the shafts 81' is inserted through the corresponding through hole 63' of the positioning plate 60' and the corresponding roller wheel 80' and 80a.

Then each roller wheel 80' and 80*a* and the arc-shaped lower end 64' of each positioning plate 60' slide on the corresponding slide rack 30'.

The invention is not limited to the above embodiment but various modification thereof may be made. Further, various changes in form and detail may be made without departing from the scope of the invention.

I claim:

1. A telescopic buffer device comprises:

a pair of parallel slide racks, a plurality of covers disposed on the slide racks, a plurality of connection plates, a plurality of positioning plates, a plurality of shafts, and a plurality of roller wheels, the covers connected telescopically, each of the connection plates disposed on the corresponding cover, each of the connection plates having a U-shaped recess, each of the positioning plates having an L-shaped slot to receive the corresponding connection plate, a notch, a through hole, and an arc-shaped lower end, a width of each of the connection plates larger than a width of the corresponding L-shaped slot of the positioning plate, each of the connection plates connected to two of the positioning plates, each of the roller wheels inserted in the corresponding lower notch of the positioning plate, and each of the shafts inserted through the corresponding through hole of the positioning plate and the corresponding roller wheel.

2. The telescopic buffer device as claimed in claim 1, wherein each of the positioning plates has an additional notch to receive the corresponding roller wheel and an additional through hole to receive the corresponding shaft.

* * * * *